United States Patent
Belli

(10) Patent No.: US 11,164,446 B2
(45) Date of Patent: Nov. 2, 2021

(54) SMOKE VALIDATION PROCESS FOR WIND TURBINES

(71) Applicant: VESTAS WIND SYSTEMS A/S, Aarhus N (DK)

(72) Inventor: Claus Belli, Galten (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 16/627,407

(22) PCT Filed: Jun. 21, 2018

(86) PCT No.: PCT/DK2018/050157
§ 371 (c)(1),
(2) Date: Dec. 30, 2019

(87) PCT Pub. No.: WO2019/001666
PCT Pub. Date: Jan. 3, 2019

(65) Prior Publication Data
US 2020/0143666 A1 May 7, 2020

(30) Foreign Application Priority Data
Jun. 29, 2017 (DK) .............................. PA201770517

(51) Int. Cl.
*G08B 29/18* (2006.01)
*F03D 17/00* (2016.01)
(Continued)

(52) U.S. Cl.
CPC ........... *G08B 29/188* (2013.01); *F03D 17/00* (2016.05); *F03D 80/82* (2016.05); *G08B 17/02* (2013.01);
(Continued)

(58) Field of Classification Search
None
See application file for complete search history.

(56) References Cited

U.S. PATENT DOCUMENTS 5,260,687 A * 11/1993 Yamauchi .............. G08B 17/00
340/511
6,046,452 A * 4/2000 Castleman ............. G08B 17/12
250/339.15
(Continued)

FOREIGN PATENT DOCUMENTS

| CN | 1129833 A | 8/1996 |
|----|-----------|--------|
| CN | 103007465 A | 4/2013 |

(Continued)

OTHER PUBLICATIONS

Danish Search Report for Application No. PA 2017 70517 dated Jan. 2, 2018.

(Continued)

*Primary Examiner* — Muhammad Adnan
(74) *Attorney, Agent, or Firm* — Patterson + Sheridan, LLP

(57) ABSTRACT

The present disclosure generally relates to validation processes in wind turbines, as well as controllers and wind turbines implementing the same. In one aspect, a method of validating smoke detection in a smoke detection system includes receiving an indication of smoke detection, determining a first temperature of a temperature sensor, and beginning a heat validation operation. The heat validation operation includes initiating a timer after determining the first temperature, and determining if a current temperature of the temperature sensor has increased a predefined amount relative to the first temperature. If the current temperature of the temperature sensor has increased a predefined amount (Continued)

relative to the first temperature, performing at least one of tripping a switchgear and activating an alarm.

12 Claims, 4 Drawing Sheets

(51) Int. Cl.
    *G08B 17/10*     (2006.01)
    *F03D 80/80*     (2016.01)
    *G08B 17/02*     (2006.01)
    *G08B 17/06*     (2006.01)
    *G08B 31/00*     (2006.01)

(52) U.S. Cl.
    CPC ............ *G08B 17/06* (2013.01); *G08B 17/10* (2013.01); *G08B 31/00* (2013.01)

(56) References Cited

U.S. PATENT DOCUMENTS

| | | | | |
|---|---|---|---|---|
| 6,064,064 | A * | 5/2000 | Castleman | G08B 17/12 250/339.05 |
| 6,078,050 | A * | 6/2000 | Castleman | G08B 17/12 250/339.15 |
| 6,445,292 | B1 * | 9/2002 | Jen | G08B 25/10 340/514 |
| 6,515,283 | B1 * | 2/2003 | Castleman | G08B 17/12 250/339.15 |
| 6,518,574 | B1 * | 2/2003 | Castleman | G08B 17/12 250/339.05 |
| 6,927,394 | B2 * | 8/2005 | Parham | G08B 17/12 250/339.15 |
| 8,155,923 | B2 * | 4/2012 | Mengane | F03D 7/047 702/182 |
| 10,253,995 | B1 * | 4/2019 | Grant | F24F 11/0001 |
| 10,460,586 | B1 * | 10/2019 | Walma | H05B 47/105 |
| 2006/0103540 | A1 * | 5/2006 | Rutter | G08B 29/181 340/628 |
| 2010/0138182 | A1 * | 6/2010 | Jammu | F03D 7/047 702/113 |
| 2011/0054825 | A1 * | 3/2011 | Perla | G05B 23/0286 702/113 |
| 2011/0057801 | A1 * | 3/2011 | Logan | G08B 31/00 340/584 |
| 2011/0144816 | A1 * | 6/2011 | Morjaria | F03D 7/048 700/287 |
| 2012/0212346 | A1 * | 8/2012 | Conforti | G08B 29/26 340/628 |
| 2013/0103213 | A1 * | 4/2013 | Ma | F03D 7/048 700/287 |
| 2013/0147195 | A1 * | 6/2013 | Krug | F03D 17/00 290/44 |
| 2013/0309088 | A1 * | 11/2013 | Steen | F03D 17/00 416/1 |
| 2013/0338938 | A1 * | 12/2013 | Coultate | F03D 80/50 702/35 |
| 2014/0015678 | A1 * | 1/2014 | Zribi | G08B 29/183 340/589 |
| 2014/0375206 | A1 * | 12/2014 | Holland | H05B 47/105 315/86 |
| 2015/0101401 | A1 * | 4/2015 | Ekanayake | F03D 17/00 73/112.01 |
| 2015/0244297 | A1 * | 8/2015 | Niemoeller | F03D 7/0284 290/44 |
| 2015/0322926 | A1 * | 11/2015 | Caponetti | F03D 7/028 416/1 |
| 2016/0215764 | A1 * | 7/2016 | Sakaguchi | G01M 5/0066 |
| 2017/0154510 | A1 * | 6/2017 | Ku | G08B 25/08 |
| 2019/0145382 | A1 * | 5/2019 | Kreutzfeldt | F03D 17/00 73/112.01 |
| 2019/0195198 | A1 * | 6/2019 | Andersen | H02J 3/381 |
| 2019/0203693 | A1 * | 7/2019 | Tiwari | H02J 3/38 |
| 2019/0362070 | A1 * | 11/2019 | Abbaszadeh | G06F 21/55 |
| 2020/0143666 | A1 * | 5/2020 | Belli | F03D 80/82 |

FOREIGN PATENT DOCUMENTS

| | | |
|---|---|---|
| CN | 103561823 A | 2/2014 |
| CN | 104183077 A | 12/2014 |
| DE | 102006055617 A1 | 5/2008 |
| EP | 1122425 A1 | 8/2001 |
| EP | 1253565 A2 | 10/2002 |
| EP | 2459453 A1 | 6/2012 |
| EP | 2549453 A1 | 1/2013 |
| GB | 2008871 A | 6/1979 |
| GB | 2252191 A | 7/1992 |
| JP | 2003248873 A | 9/2003 |
| JP | 2006068294 A | 3/2006 |
| JP | 2006068294 A * | 3/2016 |
| JP | 2016077333 A | 5/2016 |
| JP | 2016077333 A * | 5/2016 |
| WO | 2019001666 A1 | 1/2019 |

OTHER PUBLICATIONS

Danish Patent and Trademark Office First Technical Examination for Application No. 2017P0055DK RJ dated Jan. 3, 2018.
PCT International Search Report for Application No. PCT/DK2018/050157 dated Sep. 25, 2018.
PCT Written Opinion of the International Searching Authority for Application No. PCT/DK2018/050157.
Chinese Office Action for Application No. 2020122502604880 dated Dec. 30, 2020.

* cited by examiner

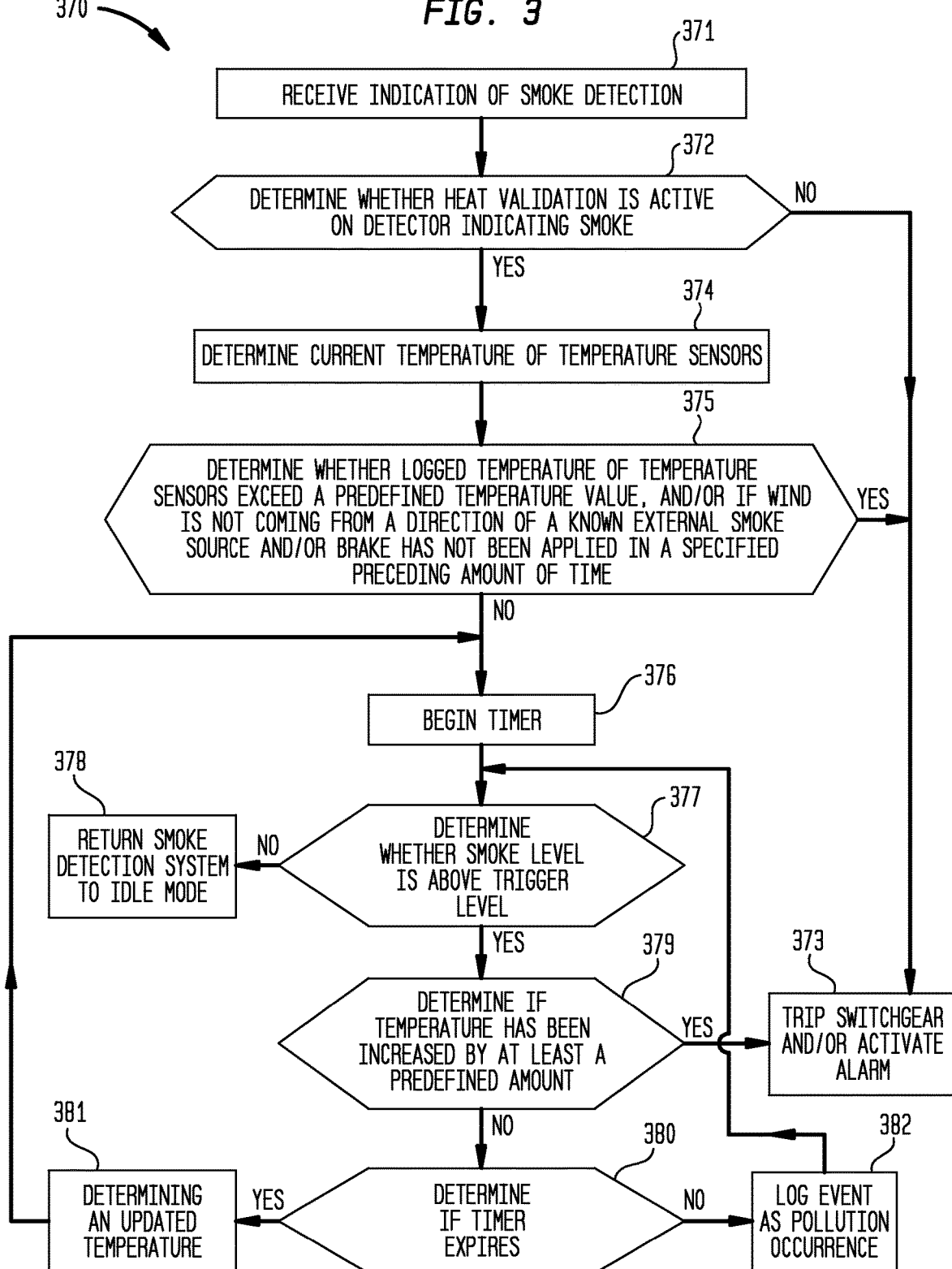

SMOKE VALIDATION PROCESS FOR WIND TURBINES

BACKGROUND

Field

Embodiments of the present disclosure generally relate to wind turbines, and more particularly, to fire-detection validation processes for wind turbines.

Description of the Related Art

Conventional wind turbines include smoke detectors for indicating the presence of smoke in wind turbines. The detected presence of smoke may indicate to personnel that attention is required, or moreover, may result in shutdown of the wind turbine. However, many sources of smoke in wind turbines are permissible and therefore do not require shut down or attention from personnel. Shutdowns that occur as a result of permissible smoke result in lost energy production and expenditure of unnecessary man hours.

Therefore, what is needed is a process for validating smoke in wind turbines.

SUMMARY

The present disclosure generally relates to validation processes in wind turbines, as well as controllers and wind turbines implementing the same. In one aspect, a method of validating smoke detection in a smoke detection system includes receiving an indication of smoke detection, determining a first temperature of a temperature sensor, and beginning a heat validation operation. The heat validation operation includes initiating a timer after determining the first temperature, and determining if a current temperature of the temperature sensor has increased a predefined amount relative to the first temperature. If the current temperature of the temperature sensor has increased a predefined amount relative to the first temperature, performing at least one of tripping a switchgear and activating an alarm.

In another aspect, a controller is disclosed. The controller includes a processor and a memory storing instructions, that when executed by the processor, cause the processor to receive an indication of smoke detection; determine a first temperature of a temperature sensor; and begin a heat validation operation. The heat validation operation comprises initiating a timer after determining the first temperature; determining if a current temperature of the temperature sensor has increased a predefined amount relative to the first temperature; and if the current temperature of the temperature sensor has increased a predefined amount relative to the first temperature, performing at least one of tripping a switchgear or activating an alarm.

In another aspect, a wind turbine comprises a tower, a nacelle having a hub coupled thereto, the nacelle disposed on the tower; one or more smoke sensors disposed in at least one of the nacelle, the tower, and the hub; one or more temperature sensors disposed in at least one of the nacelle, the tower, and the hub; and a controller coupled at least to the one or more smoke sensors and the one or more temperature sensors. The controller is configured to receive an indication of smoke detection from the one or more smoke sensors; determine a first temperature of a temperature sensor; and begin a heat validation operation. The heat validation operation comprises initiating a timer after determining the first temperature; determining if a current temperature of the temperature sensor has increased a predefined amount relative to the first temperature; and if the current temperature of the temperature sensor has increased a predefined amount relative to the first temperature, performing at least one of tripping a switchgear and activating an alarm.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

FIG. 3 illustrates a flow diagram of a method of heat validation, according to one aspect of the disclosure.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure generally relates to validation processes in wind turbines, as well as controllers and wind turbines implementing the same. In one aspect, a method of validating smoke detection in a smoke detection system includes receiving an indication of smoke detection, determining a first temperature of a temperature sensor, and beginning a heat validation operation. The heat validation operation includes initiating a timer after determining the first temperature, and determining if a current temperature of the temperature sensor has increased a predefined amount relative to the first temperature. If the current temperature of the temperature sensor has increased a predefined amount relative to the first temperature, performing at least one of tripping a switchgear and activating an alarm.

Figure 1A:
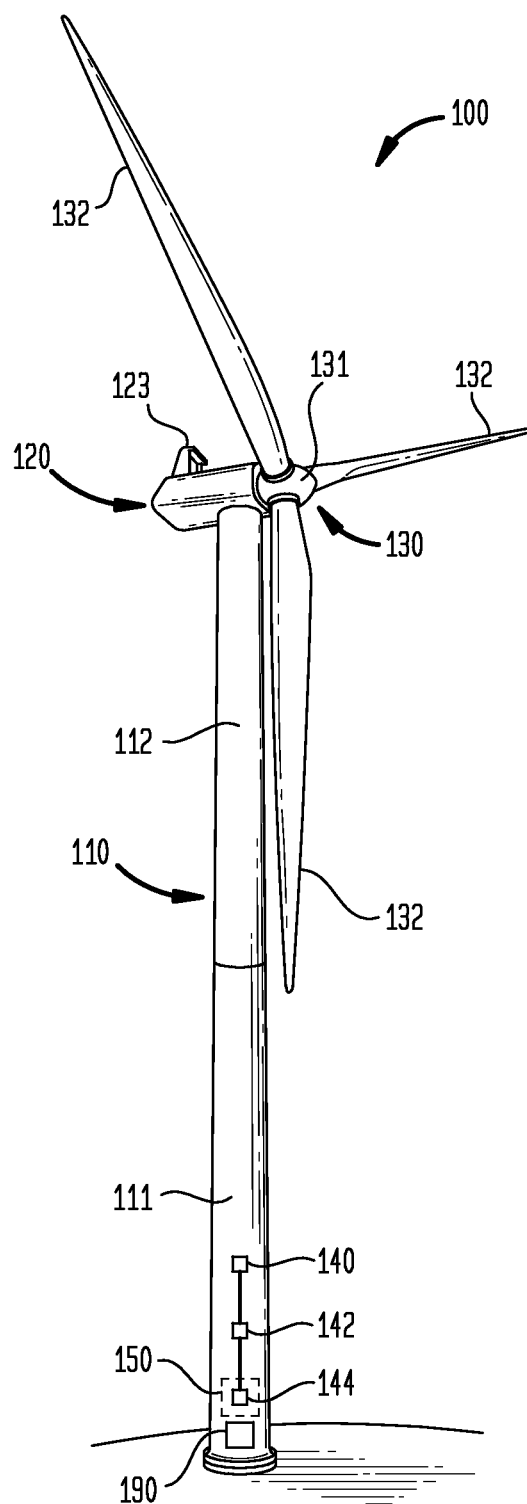
FIG. 1A illustrates a wind turbine, according to one aspect of the disclosure.
Figure 1B:
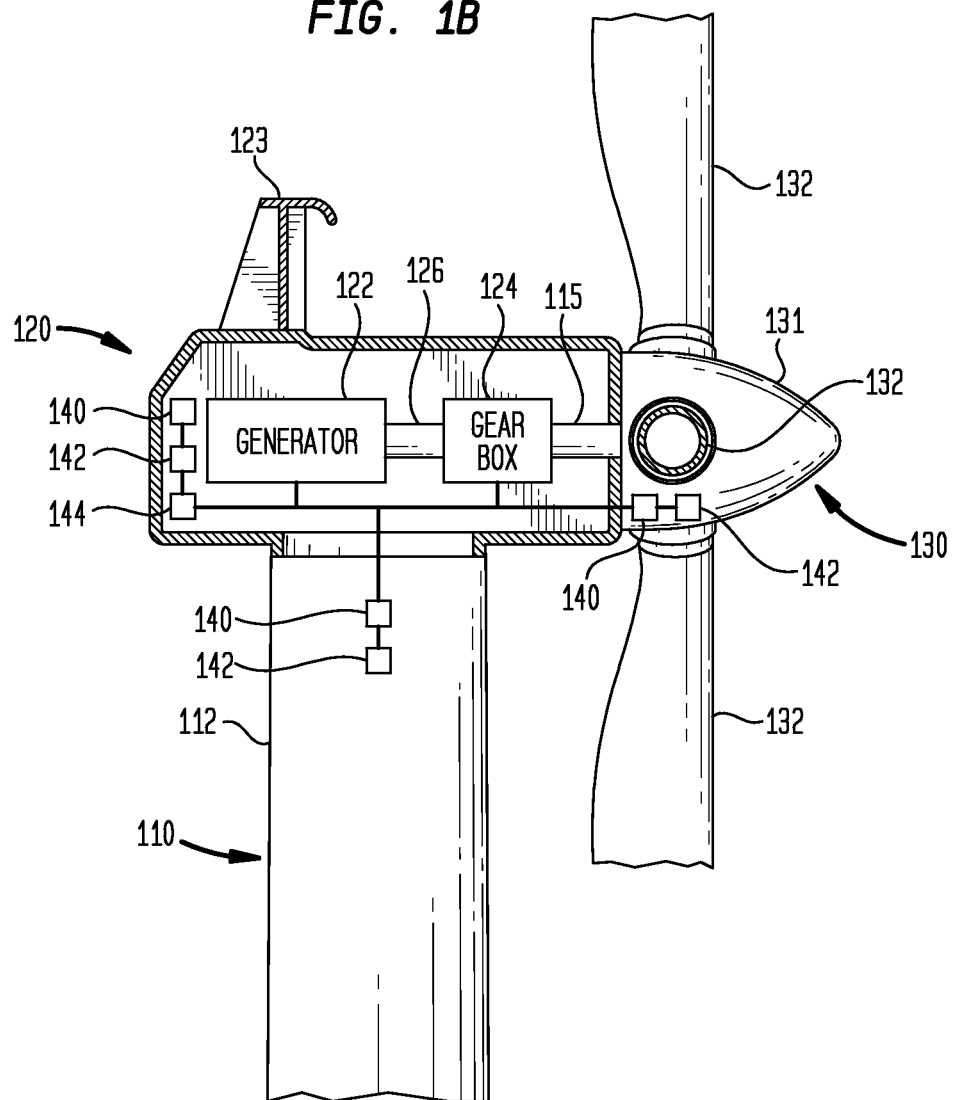
FIG. 1B illustrates a partial sectional view of the wind turbine of FIG. 1A.

FIG. 1A illustrates a wind turbine 100, according to one aspect of the disclosure. FIG. 1B illustrates a partial sectional view of the wind turbine 100 of FIG. 1A. The wind turbine 100 includes a tower 110, a nacelle 120, and a rotor 130. The tower 110 of wind turbine 100 is configured to raise the nacelle 120 and the rotor 130 to a height where strong, less turbulent, and generally unobstructed flow of air may be received by the rotor 130. The tower 110 may have a desired height and be formed from one or more of steel, concrete, or the like. In one example, the tower 110 is formed form tubular steel sections 111 and 112, but may alternatively be a monolithic structure, or formed from alternative materials. A switch gear 190, which functions as a main circuit breaker for electrical connections in the wind turbine 100, is disposed in a lower portion of the tower 110.

The rotor 130 includes a rotor hub 131 and at least one blade 132 (three blades 132 are shown). The rotor hub 131 couples the at least one blade 132 to a shaft 115 to facilitate driving of the shaft 115. A nacelle 120 houses the shaft 115 therein, and includes one or more components configured to convert aero-mechanical energy of the blades 132 to rotational energy of the shaft 115, and to convert the rotational energy of the shaft 115 into electrical energy. The one or more components housed in the nacelle 120 may include one or more of a generator 122, a gearbox 124, a drive train 126, brake assemblies, sensors, or controllers.

Non-limiting examples of sensors and controllers include one or more smoke sensors 140, one or more temperature sensors 142, and one or more controllers 144. While shown separately, it is contemplated that the one or more smoke sensors 140 and the one or more temperature sensors 142 may be packaged in housings including both a smoke sensor 140 and a temperature sensor 142. In such an example, a microchip may also be included within the housing for receiving, analyzing, combining, or performing other operations on sensor data.

It is contemplated that the one or more smoke sensors 140, one or more temperature sensors 142, and one or more controllers 144 may be positioned at any location within the nacelle 120, or optionally, externally mounted thereon. In one example, the one or more smoke sensors 140, one or more temperature sensors 142, and one or more controllers 144 are mounted to an internal surface of the nacelle 120. In another example, the one or more smoke sensors 140, one or more temperature sensors 142, and one or more controllers 144 may optionally be mounted to a surface of the generator 122 and/or the gear box 124. Other mounting configurations are also contemplated, such as in areas of increased air flow or near components of increased likelihood of ignition. In such an example, one or more smoke sensors 140 and one or more temperature sensors 142 may be mounted in the hub 131 or the tower 110.

In another example, it is contemplated that one or more controllers may additionally or alternatively be located in the tower 110, accessible through an access panel 150. In such an example, the controller 144 may be coupled to one or more smoke sensors 140 and one or more temperature sensors 142 located in the tower 110, as well as the one or more smoke sensors 140 and one or more temperature sensors 142 located in the nacelle 120 and the hub 131.

The wind turbine 100 also includes a plurality of sensors for monitoring a plurality of parameters associated with, for example, environmental conditions, wind turbine loads, performance metrics, smoke detection, and the like. In one example, the wind turbine 100 includes a wind sensor 123. The wind sensor 123 is configured to detect a direction of the wind at or near the wind turbine 100. The wind sensor 123 may also detect a speed and/or direction of the wind. In some embodiments, the wind sensor 123 may be integrated with a temperature sensor, pressure sensor, and the like, which may provide additional data regarding the environmental surroundings of the wind turbine.

Figure 2:
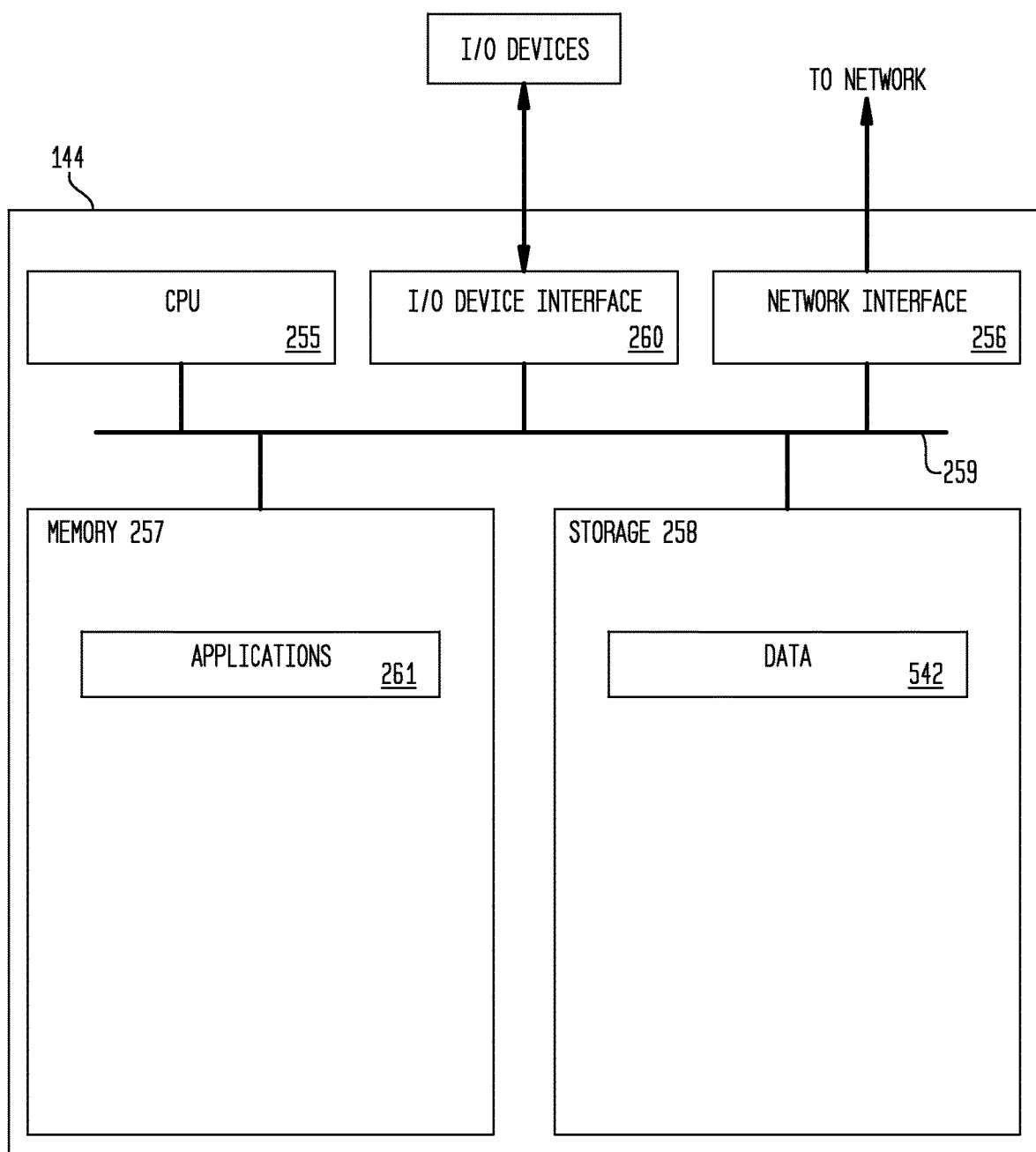
FIG. 2 illustrates one example of a controller 144 configured to implement aspects of the present disclosure.

FIG. 2 illustrates one example of a controller 144 configured to implement aspects of the present disclosure. The controller 144 includes, without limitation, a central processing unit (CPU) 255, a network interface 256, a memory 257, and a storage 258, each connected to a bus 259. The controller 144 may also include an I/O device interface 260 connecting I/O devices (e.g., wind sensor 123, one or more smoke sensors 140, one or more temperature sensors 142, etc. shown in FIG. 1B) to the controller 144. Further, the computing elements shown in the controller 144 may correspond to a physical computing system (e.g., a system in a data center) or may be a virtual computing instance executing within a computing cloud.

The CPU 255 retrieves and executes programming instructions stored in the memory 257 as well as instructions stored in the storage 258. The bus 259 is used to transmit programming instructions and application data between the CPU 255, the I/O device interface 260, the storage 258, the network interface 256, and the memory 257. It is to be noted that CPU 255 is representative of a single CPU, multiple CPUs, a single CPU having multiple processing cores, and the like, and that the memory 257 is representative of a random access memory. The storage 258 may be a disk drive or flash storage device. Although shown as a single unit, the storage 258 may be a combination of fixed and/or removable storage devices, such as fixed disc drives, removable memory cards, optical storage, network attached storage (NAS), or a storage area-network (SAN). As shown, storage 258 includes data, but such as logged data, which is received from the I/O devices and stored in the storage 258.

Illustratively, the memory 257 includes one or more applications 261. In one example, an application 261 may be a smoke detection and/or heat validation application, configured to validate when smoke detected by one or more smoke sensors 140 is a result of a fire-related event on the wind turbine 100. FIG. 3 illustrates one example of an algorithm or application that may be executed by components of the controller 144.

FIG. 3 illustrates a flow diagram of a method 370 of heat validation, according to one aspect of the disclosure. The method of 370 allows received smoke detection signals to be validated with a corresponding detection of heat increase, thereby reducing false alarms attributable to smoke detection occurrences that are not fire-related events. Examples of smoke occurrences that are not fire-related events include environmental smoke, such as from nearby factories, are smoke generated by burning of lubricating oil in mechanical components of the wind turbine 100, such as when caused by application of a brake.

The method 370 begins at operation 371. In operation 371, the controller 144 receives an indication of smoke detection. The indication of smoke detection is provided from the one or more smoke sensors 140, via the I/O interface 260 of the controller 144. Upon receiving the indication of smoke the method 370 proceeds to operation 372. In operation 372, the controller 144 determines whether heat validation is active on the detector which has indicated the presence of smoke. If heat validation is inactive, or otherwise disabled or incapable of being performed on the indicating detector, then method 370 proceeds directly to operation 373. In operation 373, a switchgear is tripped and/or an alarm is activated. Because the system is unable to perform a heat validation operation, the system utilizes the safest approach and treats every instance of smoke detection as a potential fire-related event.

Tripping of the switchgear in operation 373 results in shutdown or deactivation of power generation in the wind turbine 100, or disconnection of one or more connections, such as electrical connections, in order to halt a potential fire-related event. In one example, the switchgear is the main breaker for the wind turbine 100. Upon tripping of the switchgear, the wind turbine 100 is de-energized. Because a majority of fire events are electrical-related, de-energizing the wind-turbine may halt the fire event when detected in time. In one example, when tripping the switch gear, it is contemplated that electrical power may be disabled, while still allowing battery-powered systems to maintain power.

Additionally or alternatively, an alarm may be activated in operation 373. The alarm may be an alert, such as light or sound, or may be an indication relayed through the network interface 256 to an operator or other personnel.

If in operation 372 the controller determines that smoke validation is active on the indicating detector, then method 370 proceeds to operation 374. In operation 374, the controller 144 determines the current temperature of at least one temperature sensor 142, such as at each of the one or more temperature sensors 142. The determined temperatures may be stored in one or both of the memory 257 or the storage 258. Once the temperatures have been stored, method 370 proceeds to operation 375. In operation 375, the controller 144 makes one or more additional determinations. These determinations may include whether the logged temperature of any of the one or more temperature sensors 142 exceeds a predefined temperature value, whether wind is not coming from a direction of a known external smoke source, and/or if a brake device has not been applied in a specified amount of time with respect to received indication of smoke detection.

The determination whether the logged temperature of any of the one or more temperature sensors 142 exceeds a predefined temperature value is accomplished by the controller comparing the logged current temperature values from operation 374 to a value stored in either the memory 257 or the storage 258. The predefined temperature value may be a user preset, and may be for example, 20 degrees Celsius, 25 degrees Celsius, 30 degrees Celsius, or any other selected value.

The determination as to whether wind is not coming from a direction of a known external smoke source, such as a smoke-producing factory or wildfire, is determined by controller 144. In doing so, the controller 144 compares a wind direction detected by the wind sensor 123 to directions of known sources of smoke saved in the memory 257 or the storage 258. The directions of known sources of smoke may be input by a user depending upon environmental surroundings of each individual wind turbine 100.

The determination whether a brake device has been applied in a specified amount of time with respect to received indication of smoke detection is determined via a signal received from a brake sensor (not shown). The controller 144 may poll the brake sensor during operation 375, or alternatively, the controller 144 may log each braking occurrence with a corresponding time stamp in the memory 257 or the storage 258.

An affirmative determination to any of the inquiries of operation 375 results in operation 370 proceeding to directly to operation 373. An affirmative determination in operation 375 is generally indicative of a non-permissible source of smoke in the wind turbine 100, such that method 370 need not proceed to remaining operations before tripping a switchgear or initiating an alarm.

If, however, no affirmative determinations are made during operation 375, the method 370 proceeds to operation 376. Operation 376 is a beginning point of a heat validation operation. The heat validation operation (for example, one or more of operations 376-382) confirms the presence of a temperature increase on the wind turbine 100, indicative of local fire event, thereby indicating that the smoke detection of operation 371 is not likely a false alarm.

In operation 376, the controller 144 initiates a timer, such as a timer local to the controller 144. Subsequently, in operation 377, the controller makes a determination whether the smoke level is above a trigger level. This determination includes polling (or otherwise receiving data from) each of the one or more smoke sensors 140 to determine a detected level of smoke by each of the one or more smoke sensors 140. The detected level of smoke is compared to a trigger level, which is the level which indicates smoke detection in operation 371. In doing so, the controller 144 determines whether the initial detection of smoke is a transient smoke detection which does not require further action, monitoring, or assessment, or whether further action is warranted. If the smoke detection values of the one or more sensors 140 are below the trigger level value, method 370 proceeds to operation 378, and the smoke detection system of the wind turbine 100 returns to a standby (or default) idle detection mode. It is to be noted that the trigger level may be a factory preset detection value of the smoke sensors, or the trigger level may be user-programmable.

If the controller 144 determines in operation 377 that the values of detected smoke of any of the one more smoke sensors 140 are above the trigger level, the method 370 proceeds to operation 379. In operation 379, a determination is made by the controller 144 as to whether the temperature detected by any of the one or more temperature sensors 142 has increased by a predefined amount. The determination is made by comparing the temperatures sensed by the one or more temperature sensors 142 at the present time to the temperatures logged during operation 374. If the difference between a logged temperature value and a temperature value detected at the present time exceeds the predefined amount, then method 370 proceeds to operation 373. If the difference does not exceed the predefined amount, method 370 proceeds to operation 380. It is to be noted that the predefined value may be user input. In one example, the predefined amount is 2 degrees Fahrenheit. In another example, the predefined amount is 3 degrees Fahrenheit or 5 degrees Fahrenheit. Other predefined amounts are also contemplated.

In operation 380, the controller 144 determines if the timer initiated in operation 376 has expired. It is contemplated that the interval of the timer may be set to any desired interval. In one example, the timer interval is 10 minutes. If the timer has expired, method 370 proceeds to operation 381 and determines an updated temperature value of the one or more temperature sensors 142, e.g., a temperature value at the present time, and then returns to operation 376 for continued monitoring. The updated temperature values may be stored in the memory 257 or the storage 258. The updated temperature values may replace the temperature values stored in operation 374, or the updated temperature values of operation 381 may be stored in addition to the temperature values stored in operation 374. If the controller 144 determines that the timer has not expired in operation 380, the method 370 proceeds to operation 382, and the controller logs a pollution occurrence in the memory 257 or the storage 258, before returning to operation 377 for continued operations.

It is to be noted that while the heat validation operation (e.g., operation 376 onward) may occur multiple times before expiration of the timer. In effect, such operation may be considered "constant" monitoring of the temperature sensors during the validation operation. In one example, the heat validation operation may occur once every one to ten seconds. For example, a heat validation operation may occur once every 3 seconds, or once every 5 seconds. Other timeframes are also contemplated.

While FIG. 3 illustrates one example of a method 370, alternatives are also contemplated. In one example, receipt of an indication of smoke detection in operation 371 results in the controller 144 monitoring a plurality of smoke sensors 140 and temperature sensors 142, such as all smoke sensors 140 and all temperature sensors 142 during operation 370.

Benefits of the disclosure include validation of smoke sources to determine if the smoke sources are attributable to fire-related events which require shutdown of a wind turbine or initiation of an alarm. Such validation reduces the number of false alarms, such as those attributable to environmental smoke, smoke generated by a brake, or the like, which does not require shutdown of a wind turbine or initiation of an alarm. By reducing the numbers of false alarms or unnecessary shutdowns, wind turbines remain in operation, thereby maximizing energy production. Moreover, personnel time is more efficiently spent since personnel do not have to spend valuable time attending to alerts or shutdowns which do not necessitate action.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." The present disclosure may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

The invention claimed is:

1. A method of validating smoke detection in a smoke detection system of a wind turbine, comprising:
   determining a first temperature of a temperature sensor after receiving an indication of smoke detection; and
   beginning a heat validation operation, the heat validation operation comprising:
      initiating a timer after determining the first temperature;
      before the timer expires, determining whether a current temperature of the temperature sensor exceeds the first temperature by a predefined amount;
      determining whether a smoke level exceeds a trigger level;
      before the timer expires, if the current temperature of the temperature sensor does not exceed the first temperature by the predefined amount and if the smoke level exceeds the trigger level, determining an occurrence of pollution; and
      if the current temperature of the temperature sensor exceeds the first temperature by the predefined amount, tripping a switchgear to de-energize the wind turbine.

2. The method of claim 1, further comprising returning the smoke detection system to idle when the smoke level is below the trigger level.

3. The method of claim 1, wherein the heat validation operation further comprises determining whether the timer has expired.

4. The method of claim 3, wherein, if the timer has expired, further comprising repeating the heat validation operation.

5. The method of claim 4, wherein repeating the heat validation operation comprises determining an updated temperature of the temperature sensor.

6. The method of claim 1, further comprising one or more of:
   determining whether the first temperature of the temperature sensor exceeds a predefined temperature value;
   determining whether wind is not coming from a direction of a known external smoke source; or
   determining whether a brake has not been applied in a specified preceding time period.

7. A controller, including a processor and a memory storing instructions, that when executed by the processor, cause the processor to:
   determine a first temperature of a temperature sensor after receiving an indication of smoke detection; and
   begin a heat validation operation, the heat validation operation comprising:
      initiating a timer after determining the first temperature;
      before the timer expires, determining whether a current temperature of the temperature sensor exceeds the first temperature by a predefined amount;
      determining whether a smoke level exceeds a trigger level;
      before the timer expires, if the current temperature of the temperature sensor does not exceed the first temperature by the predefined amount and if the smoke level exceeds the trigger level, determining an occurrence of pollution; and
   if the current temperature of the temperature sensor exceeds the first temperature by the predefined amount, tripping a switchgear to de-energize a wind turbine.

8. The controller of claim 7, wherein the heat validation operation further comprises determining whether the timer has expired.

9. The controller of claim 8, wherein, if the timer has expired, the processor executes instructions to repeat the heat validation operation.

10. The controller of claim 9, wherein repeating the heat validation operation comprises determining an updated temperature of the temperature sensor.

11. A wind turbine, comprising:
   a tower;
   a nacelle having a hub coupled thereto, the nacelle disposed on the tower;
   one or more smoke sensors disposed in at least one of the nacelle, the tower, and the hub;
   one or more temperature sensors disposed in at least one of the nacelle, the tower, and the hub; and
   a controller coupled at least to the one or more smoke sensors and the one or more temperature sensors, wherein the controller is configured to:
      determine a first temperature of a temperature sensor after receiving an indication of smoke detection; and
      begin a heat validation operation, the heat validation operation comprising:
         initiating a timer after determining the first temperature;
         before the timer expires, determining whether a current temperature of the temperature sensor exceeds the first temperature by a predefined amount;
         determining whether a smoke level exceeds a trigger level;
         before the timer expires, if the current temperature of the temperature sensor does not exceed the first temperature by the predefined amount and if the smoke level exceeds the trigger level, determining an occurrence of pollution; and
         if the current temperature of the temperature sensor exceeds the first temperature by the predefined amount, tripping a switchgear to de-energize the wind turbine.

12. The wind turbine of claim 11, wherein the heat validation operation further comprises determining whether the timer has expired.

* * * * *